US006950627B2

(12) United States Patent
Vicari

(10) Patent No.: US 6,950,627 B2
(45) Date of Patent: Sep. 27, 2005

(54) METHOD AND APPARATUS FOR PROVIDING A WIRELESS AIRCRAFT INTERPHONE SYSTEM

(75) Inventor: Michael Vicari, Fountain Valley, CA (US)

(73) Assignee: Microelectronics Research, Santa Ana, CA (US)

(*) Notice: Subject to any disclaimer, the term of this patent is extended or adjusted under 35 U.S.C. 154(b) by 567 days.

(21) Appl. No.: 10/108,105

(22) Filed: Mar. 27, 2002

(65) Prior Publication Data

US 2004/0192362 A1 Sep. 30, 2004

(51) Int. Cl.[7] .................................................. H04Q 7/00
(52) U.S. Cl. ...................................................... 455/41.2
(58) Field of Search .............................. 455/41.2, 41.3, 455/400, 3.06, 431

(56) References Cited

U.S. PATENT DOCUMENTS 1,484,973 A * 2/1924 Stevenson et al. .......... 455/431
3,999,015 A 12/1976 Snyder et al.
4,584,707 A * 4/1986 Goldberg et al. .......... 455/41.2
5,133,081 A 7/1992 Mayo
5,784,685 A 7/1998 Stanford et al.
5,973,722 A 10/1999 Wakai et al.
6,243,573 B1 6/2001 Jacklin
6,459,882 B1 * 10/2002 Palermo et al. ............ 455/41.1
6,545,601 B1 * 4/2003 Monroe ...................... 340/521
6,795,688 B1 * 9/2004 Plasson et al. ............. 455/41.2

* cited by examiner

*Primary Examiner*—Nick Corsaro
(74) *Attorney, Agent, or Firm*—Daniel L. Dawes; Myers Dawes Andras & Sherman LLP

(57) ABSTRACT

A radio frequency transceiver system is used for communications among the crewmembers of an aircraft, either inside or immediately outside. Aside from employing analog and digital circuits, the system utilizes Frequency Hopping Spread Spectrum (FHSS), Digital Spread Spectrum (DSDS), Time Division Duplex (TDD) or Time Division Multiple Access (TDMA) as to provide reliable and secure communications contact, regardless of adverse weather conditions, handling or operating stresses, or other conditions which would otherwise affect transmissions as in prior art devices. The system virtually eliminates interconnect aircraft cable damage; operational delays caused by missing cables, or broken cables; and delays or malfunctions resulting from having cables of the wrong size, length, weather resistance, etc. Since a crewmember has no interconnecting aircraft cable, this system allows greater freedom of moment about the aircraft, and crewmembers can no be inadvertently tripped, or lose balance.

35 Claims, 3 Drawing Sheets

METHOD AND APPARATUS FOR PROVIDING A WIRELESS AIRCRAFT INTERPHONE SYSTEM

BACKGROUND OF THE INVENTION

1. Field of the Invention

The invention relates to the field of aircraft communications equipment and in particular to communication systems used to provide communications between the ground crew, cabin crew and flight crew. The invention relates to two or multi-way radio systems and communication networks for use with aircraft operation and service, either within or from outside the cabin.

2. Description of the Prior Art

Under current aircraft ground communication systems, a ground crew person communicates with the cockpit using either a headset or handset. The headset or handset has an integral earphone, microphone, and Push-to-Talk (PTT) elements. These elements are connected through wires to a plug, and the plug is inserted into an audio jack on the exterior of the aircraft, usually concealed within a covered access hatch or to a jack within the cabin of the aircraft. There are two such communication systems on typical commercial and military aircraft providing such communications, and in the industry these systems are referred to as aircraft interphone systems.

During arrival, dispatchment, flight, and maintenance, a communications system is necessary for those members operating or conducting activities in or about an aircraft. To accommodate these activities a communications system is incorporated into the aircraft. Referred to as the aircraft interphones, there are typically three independent interphone systems: cabin interphone, service interphone and to a lesser extent, flight interphone.

All interphone systems on aircraft are designed and operate in similar fashion. Specifically, there are a series of two-way audio connections where audio is brought into a central amplifier and distributed back out on a "party line" network. In this type of communication architecture a crewmember couples onto the network using a corded headset or handset. Once connected, any crewmember's handset, or headset hears any audio intelligence across the network. Should the crewmember desire to communicate as well, then he or she merely engages their microphone by pressing their Push-to-Talk (PTT) switch.

There are some phases of flight that are deemed very important to aircraft operation. Two such phases are departure and landing, and the following provides further details about these phases.

Departure

During the departure phase a ground crew person responsible to pushing the aircraft away from the terminal will plug their headset into the interphone system on the side of the aircraft in order to communicate with the cockpit. Once the aircraft is pushed back from the gate and terminal area and when the push bar is disconnected and clear of the aircraft, the ground crew person will inform the flight crew the aircraft is ready for flight.

Under current means a long cable, cable extensions, or cable reel systems (See U.S. Pat. Nos. 5,453,585 and 6,241,063), are necessary to connect the ground crew person to the audio interphone jack on the aircraft. Since the ground crew operates the tractor at a distance from the aircraft body, the cable, and/or any extensions, are susceptible to entanglement and damage about the push bar and tractor machinery. Should communications between the ground crew person and the cockpit fail at this time, departure would be delayed.

Landing

In consideration of commercial passenger aircraft, there are two cases of landing to be concerned with; normal and emergency landings. During landing of commercial aircraft flight attendants must inform passengers to "ready the aircraft for landing" (i.e. stow baggage, place tray tables upright, and secure infants), and theses announcements are stated through a corded handset from a fixed location within the aircraft. Additionally, the flight attendants must verify cabin readiness for landing, so they move about inspecting the cabin after the announcement is made. During an emergency situation though, the period of time to ready the cabin is abbreviated.

Currently, a flight attendant will inform passengers regarding landing procedures from a short length corded handset in a fixed location. This approach requires an announcement to be made first, and inspection of cabin's readiness for landing secondary. Should a long cable be employed in order to allow the flight attendant to announce landing procedures and check the cabin concurrently, the cable can easily become entangled or damaged. Alternatively, should the announcement station realize a failure, the announcement is delayed.

Prior art systems typically employ a headset consisting of earphones, two pieces that surround both left and right ears of the head, a microphone that is mounted to one earphone and extended in front of the user's mouth, a Push-to-Talk (PTT) switch that is integrated with the connecting cord, and a plug that serves as a coupling means with the aircraft interphone system. This does not preclude, however, the earphones, microphones and PTT switch being separated or packaged differently.

In an alternate form called a handset, a singular earphone is integrated with the microphone and PTT switch, and all are contained most typically within a plastic structure that very closely resembles a telephone handset. The unique cosmetic difference between a discrete, corded telephone handset and an aircraft handset is the PTT switch and the cable plug.

In both prior art arrangements the coupling plug is inserted into a jack of the aircraft interphone system. This system has certain amplifiers, microphone bias, and distributed wired jacks throughout the aircraft. Within the aircraft, interphone jacks can be found in the cockpit for the flight crew (e.g. Pilot and First Officer), and in the cabin at strategic points. For commercial passenger aircraft, for example, these strategic locations can be the Forward cabin (i.e. First Class), Mid-cabin (i.e. Business Class), and Aft cabin (i.e. Coach Class). For military aircraft these locations will differ, though the intention is the same. And on the outside of the aircraft, interphone jack locations can be found at the nose, landing gear wells, wing tips, and cargo areas.

In regular operation the cockpit (i.e. Pilot or First Officer) may converse with a ground crewperson on the ground. Assuming both parties are plugged in the interphone system, they will merely activate the PTT switch that gates, or enables, their respective microphone and then carry out spoken communications.

In summary, there are some basic problems with these interphones systems, namely:

The crew is restricted by the wired nature of such systems to a short distance of movement about the aircraft.

Communication between the cockpit and crew is interrupted when the cable is inadvertently pulled from the audio jack or the cable is pinched or torn.

The cabling between the aircraft and crew is susceptible to damage when maximum cord length is exceeded.

Longer cables, cable extensions, and cable reel systems increase the probability of entanglement.

What is needed is some type of communication system which is practical, robust, can be used in the typical environment of aircraft operation and which is economically manufactured.

BRIEF SUMMARY OF THE INVENTION

To address the prior art defects listed above the wireless aircraft interphone system (WAIS) of the invention utilizes self-contained radio frequency transceivers. These transceivers interface, or connect to, the existing interphone systems on the aircraft to allow for practical retrofitting to pre-existing wired communications systems, and to the headset or handset used by crewmembers. For example, one transceiver is central to cockpit communications for the flight crew, and another transceiver is with a cabin or ground crewmember, either inside or outside the aircraft. In this arrangement there is no physical wire, or cable, tethering the crew to the aircraft. Hence, the crewmember is free to move about the aircraft, and damage to, or disconnection of, the interconnecting aircraft cable is virtually eliminated.

A wireless aircraft interphone system for aircraft provides means to convey intelligence, such as the spoken word, to and from individuals within the cockpit to other essential personnel within and about aircraft, such as the flight attendants and ground crew. And although these communications typically relate to arrival, departure and in-flight procedures, the WAIS can be utilized for other types of communications.

The invention is thus a radio frequency transceiver system used for communications among the crewmembers of an aircraft, either inside or immediately outside. Aside from employing analog and digital circuits, the system utilizes frequency hopping spread spectrum (FHSS), and time division duplex (TDD), digital spread spectrum (DSS) or time division multiple access (TDMA) as to provide reliable and secure communications contact, regardless of adverse weather conditions, handling or operating stresses, or other conditions which would otherwise affect transmissions as in prior art devices. The system virtually eliminates interconnect aircraft cable damage; operational delays caused by missing cables, or broken cables; and delays or malfunctions resulting from having cables of the wrong size, length, weather resistance, etc. Since a crewmember has no interconnecting aircraft cable, this system allows greater freedom of moment about the aircraft, and crewmembers can not be inadvertently tripped, or lose balance.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
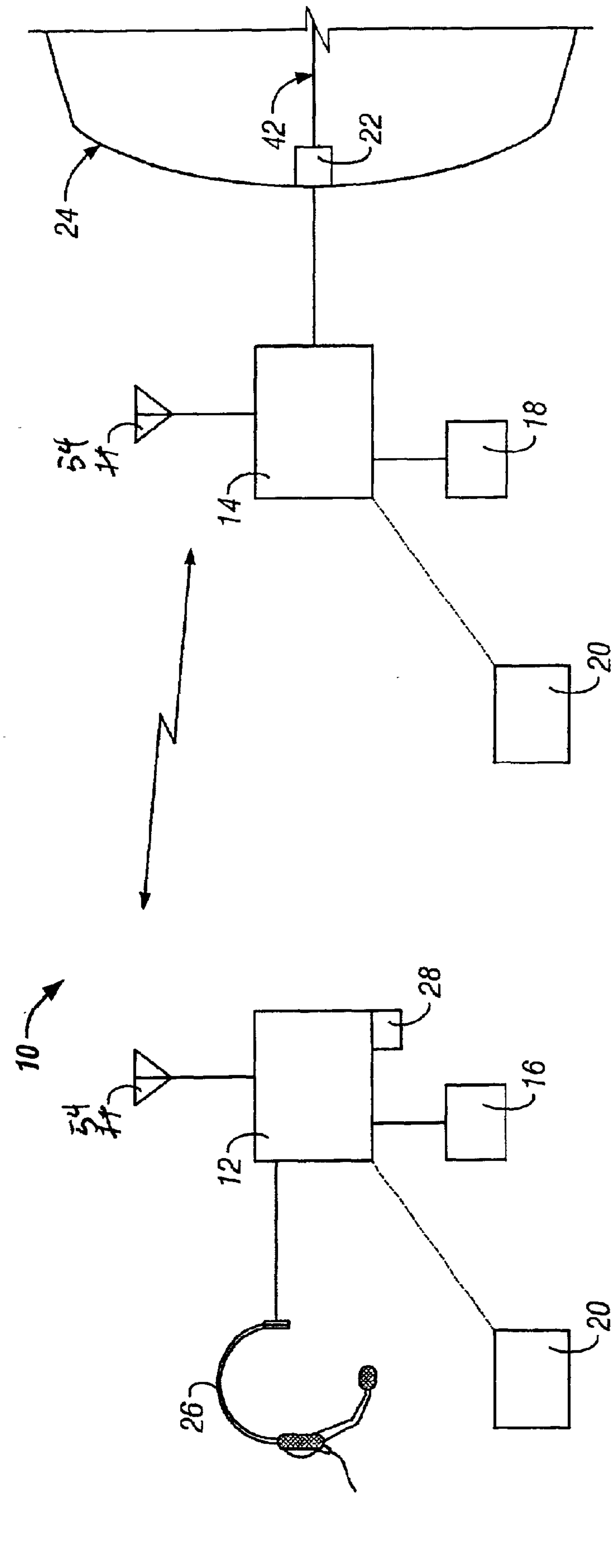
FIG. 1 is a highly simplified block diagram of a master-slave network of the invention for wireless communication with the interphone system of an aircraft.

As diagrammatically shown in FIG. 1 the wireless aircraft interphone system, generally denoted by reference numeral 10, is comprised of two self-contained radio transceivers 12 and 14, each with an antenna 54 and with audible and visible enunciators 16 and 18 respectively providing operational status signals to the users. With this arrangement a ground maintenance person may communicate to the aircraft cockpit, or a cabin attendant may communicate within the environment of the cabin to passengers. Should the inclusion of more crewmembers be warranted, additional radios 12' may be added forming a local telecommunication network using time division duplex (TDD) or time division multiple access (TDMA) communication techniques. Any communication protocol now known or later devised for a wireless network may be substituted with full equivalency.

A radio frequency transceiver system 10 is used for communications among the crewmembers of an aircraft, either inside or immediately outside the aircraft. Aside from employing analog and digital circuits, the system utilizes frequency hopping spread spectrum (FHSS), and time division duplex (TDD), digital spread spectrum (DSS), or time division multiple access (TDMA) as to provide reliable and secure communications contact, regardless of adverse weather conditions, handling or operating stresses, or other conditions which would otherwise affect transmissions as in prior art devices.

Further, it is to be understood that multiple ground crews, each with its own separate radio network 10, may be working with close proximity to each other and certainly within radio coverage overlap of each other. Hence, it is contemplated that communication systems or protocols will be used which will automatically adjust for multiple system overlap to prevent interference.

System 10 virtually eliminates interconnect aircraft cable damage; operational delays caused by missing cables, or broken cables; and delays or malfunctions resulting from having cables of the wrong size, length, weather resistance, etc. Since a crewmember has no interconnecting aircraft cable, this system allows greater freedom of moment about the aircraft, and crewmembers can no be inadvertently tripped, or lose balance.

Consider now the functional operation of system 10. In a first example, shortly before aircraft arrival, the ground crew will obtain the aircraft and ground radio modules 12 and 14 for subsequent use. These units 12 and 14 are typically docked with the charging unit 20 for the purpose of replenishing module power or may be docked together.

Upon aircraft arrival, the ground person plugs the aircraft module 14 into the interphone audio jack 22 conventionally supplied in aircraft 24. Conversely, the ground person plugs his, or her, headset 26 into the ground radio or module 12. This ground module 12 with integral Push-to-Talk (PTT) switch 28 replaces the PTT switch currently used by the ground crew. From there forward, communication resumes in normal fashion.

Figure 2:
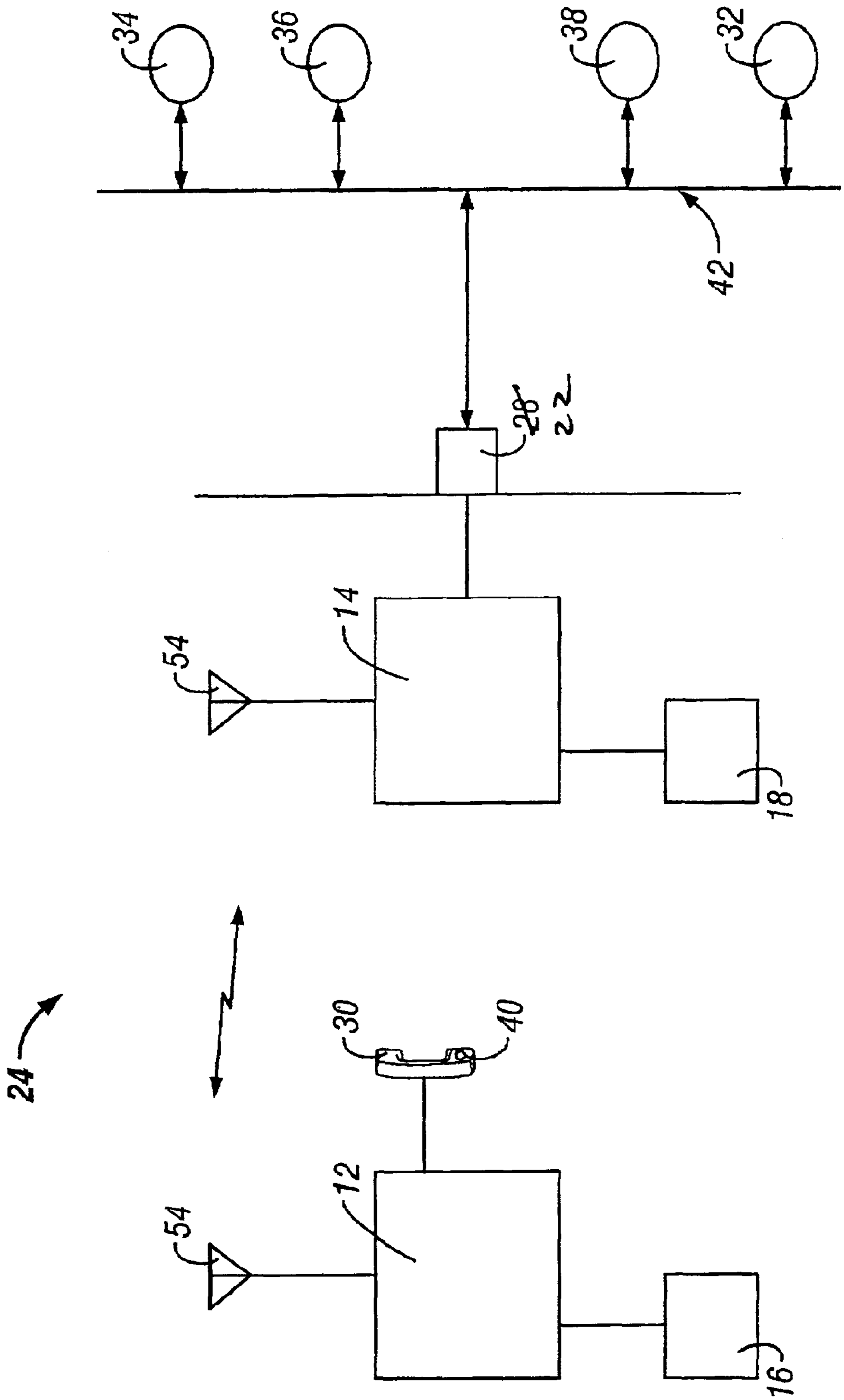
FIG. 2 is a highly simplified block diagram of a master-slave network used within an aircraft for communication with the interphone system of the aircraft

In a second example, diagrammatically illustrated in FIG. 2 communication by the flight attendants within the cabin of aircraft 24 is similar to that of the example above. An aircraft master module 14 is plugged into the cabin interphone audio jack 28 conventionally supplied inside aircraft 24, and the flight attendant's handset 30 plugs in a slave module 12, which may be mobile with the flight attendant. Thereafter, the flight attendant selects either the passenger address (PA) system 32 or interphone station number 34, 36, or 38 (i.e. cockpit, forward or aft stations respectively for example), and proceeds with normal communications by pressing the Push-to-Talk (PTT) switch 40 on the handset 30.

The master and slave transceivers 14 and 12 provide continuous communications through the aircraft interphone system 42 and the crewmember while the master radio 14 is coupled to the aircraft interphone system 42 and the communication link is established with the slave radio 12. The arrangement described above does call for individual radio modules 12 and 14. However, the radio units 12 and 14 can be integral to the crewperson's headset or handset 26, 30, and the aircraft 24 may also have an integral radio 14 built into aircraft 24. Additionally, the radio network 10 of the invention may also be utilized in conjunction with the installed flight interphone system built into aircraft 24. The slave transceiver 12 may be is mounted in a fixed location or may be portable. In most practical systems 10 a plurality of slave transceivers 12 are included within the system 10. Each slave transceiver 12 operates in a private communication network with other ones of the plurality of slave transceivers 12.

Therefore, it can be appreciated that what is disclosed is a wireless radio system 10 for combination an aircraft interphone system 42 comprising a master radio frequency, wireless transceiver 14 for interfacing with the aircraft interphone system and for communicating with a crewmember, either within or outside to the aircraft 24. The master transceiver 14, which may be located either inside of the aircraft or exterior to it, is connected with the aircraft interphone system 42 through a interphone audio jack 22 accessible through an exterior access hatch or accessible from within the cabin depending on whether master transceiver 14 is exterior to or interior to the aircraft. At least one slave radio frequency wireless transceiver 12 is used by a crew person for wireless communication to the master transceiver 14 and thence to the aircraft interphone system 42 connected to master transceiver 14. The wireless radio system comprised of the master and slave transceivers 14 and 12 support either half or full duplex operation using conventional circuit structures and methodologies.

Figure 3:
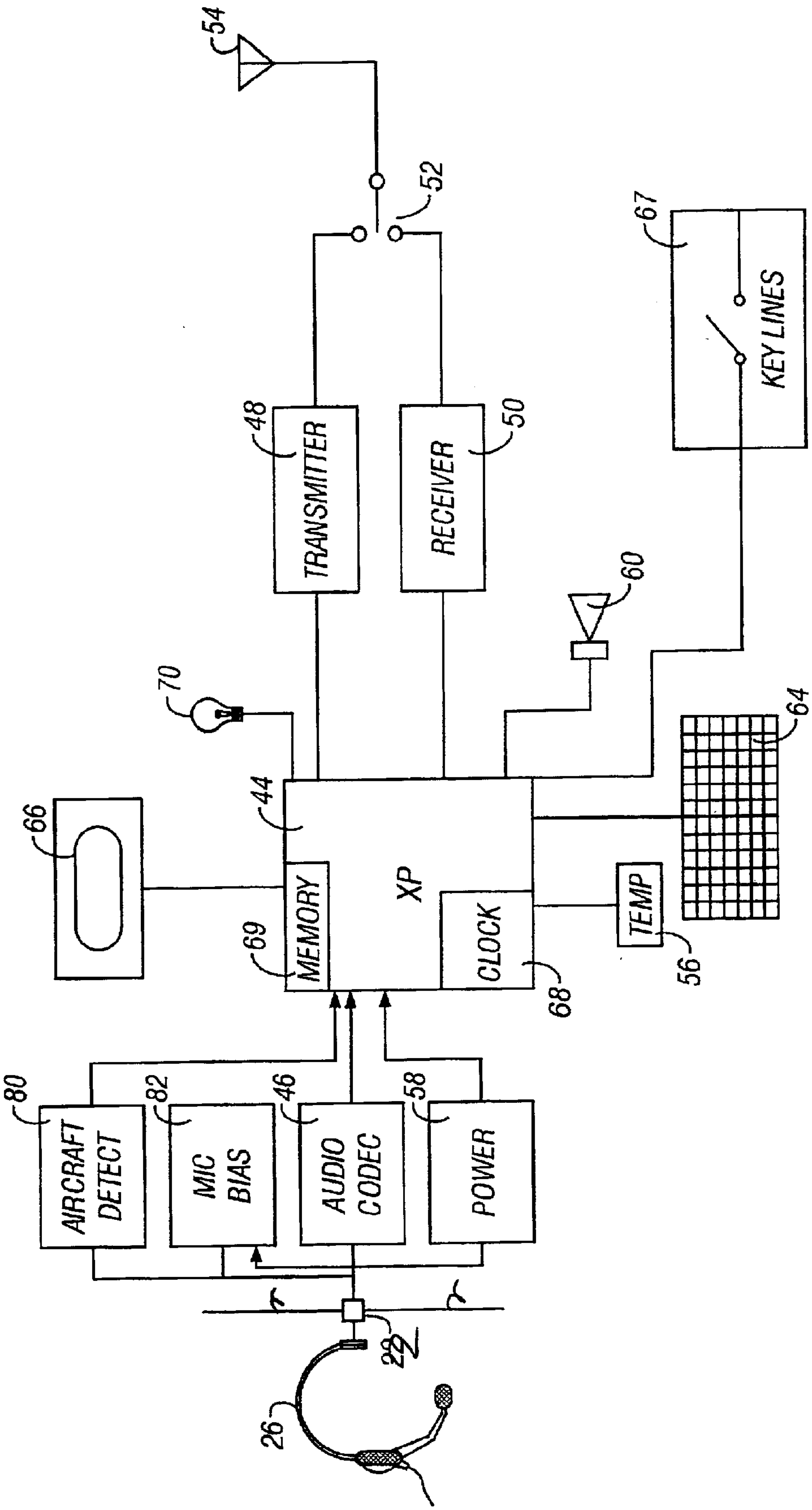
FIG. 3 is a highly simplified block diagram of a master or slave transceiver as used in the networks illustrated in FIGS. 1 and 2.

As diagrammatically depicted in FIG. 3 the master and slave transceivers 14 and 12 further include baseband processor 44, which may be understood to include software or firmware memory, provide both voice and digital data communications. The architecture of system 10 may be altered in a large variety of ways without departing from the spirit and scope of the invention. The characterizing feature of system 10 is its flexible and diverse operational functionality in combination with the interphone system of aircraft 24 both in configurations operating entirely within the aircraft and operating exterior to the aircraft. Baseband processor 44 is coupled to a transmitter 48 and receiver 50, which are digitally controlled. Transmitter 48 and receiver 50 are electronically switched as appropriate by RF switch 52 to shared antenna 54. Processor 44 is coupled to codec 46 which provides the means to digitize analog signals being received from or sent to headset 26.

Processor 44 is also coupled to input means 64 to externally configure, signal, or operate the transceiver by use of switches, buttons, or a keypad. Because processor 44 is a fully interactive device, a display indication means 66 such as an incandescent light, light emitting diode (LED), or liquid crystal display (LCD) included as part of the master and slave transceiver 14 and 12 is coupled to processor 44. Types of information which can be displayed by the display indication means 66 is quite general, and include, but are not limited to, communication link condition, power source level, power ON/OFF, diagnostic results, or information and messages that are sent between the master and slave transceivers 14 and 12. Thus, it can be understood that processor 44 is programmed with a routine whereby a built-in test means is provided during operation to continually monitor communication link integrity, which is displayed by display indication means 66. Audio transducer 60 is then used to activate an audible warning resulting from marginal operating conditions of any kind during built-in test, including marginal communication link. In particular, processor 44 is programmed to detect when connected or not to aircraft 24 through an aircraft detect circuit 80, which determines if a microphone of headset 26 is connected to jack 22 by sensing the microphone bias current provided by the aircraft interphone system 42. Aircraft detect circuit 80 is included within master transceiver 14 where it would function to detect connection with aircraft 24 as shown in FIG. 1. Similarly, MIC BIAS circuit 82 is included within slave transceiver 12. In this case display indication means 66 visibly displays the status and audio transducer 60 audibly generates distinct and/or audible signals to indicate when the connection is broken or established. In each case, a distinctive audible signal can be generated by processor 44, through interphone system 42 and/or by transmission to the slave transceiver 12 to announce when the connection is broken or established. Processor 44 is also coupled to key lines means 67 to externally control, signal or operate circuits for, but not limited to, selective communication keyed to passenger address (PA), aft or forward stations with aircraft interphone system 42. Bias for headset 26 is supplied by microphone bias circuit 82, which is powered in turn by transceiver 12's power source 58.

In the preferred embodiment, the master transceiver 14 further comprises an illumination source 70 so that master transceiver 14 is brightly colored and/or illuminated as a beacon so it can be easily seen or spotted. For example, master transceiver 14 may be painted with phosphorescent paint or made at least in part with phosphorescent materials.

Processor 44 is further provided with a built-in clock circuit or software clock 68 so that processor 44 keeps track of the time-of-day, which can then be selectively displayed on indication means 66. In particular, display and tracking of the calendar day of the week, month, and year is possible. If desired, processor 44 is programmable to establish alarm events associated with the time of day, or with the calendar day of the week, month, and year, which events can be announced by audio transducer 60. If an event occurs, it can be cleared from processor 44 through the use of input means 64. This timing function also allows processor 44 to be used for various chronometer functions, such as the tracking and display of elapsed time or establishing and announcing alarm events with elapsed time. The system 10 of the invention thus is capable of becoming a time manager of aircraft ground operations.

The master and slave transceivers 14 and 12 may operate from external or internal power or both. Processor 44 or other logic circuitry may include a power savings mode for extending operational time of the radio according to conventional design principles.

The master and slave transceivers 14 and 12 include means for connection to each other through wired means or wirelessly, to verify performance before placing the master and slave transceivers into service. The master and slave transceivers 14 and 12 automatically acquire and track other slave radios in a uniquely associated network. Such network communications includes multichannel communication controlled by processor 44 and the ability to automatically hop to a different channel if interference is detected according to conventional channel hoping protocols. In one embodiment the master and slave transceivers 14 and 12 support multiple wireless slave radios 12 which sharing the same radio frequency spectrum using conventional time division duplex (TDD) methodologies. In another embodiment the master and slave transceivers 14 and 12 employ a unique "N-Bit" identification code used by processor 44 to control channel and signal scrambling according to software control and implemented by processor 44. Preferably the "N-Bit" identification code is a reconfigurable identification code in each master and slave transceiver 14 and 12.

Processor 44 is coupled to a temperature sensor 56 and power supply 58, which may be either internal or external. Processor 44 includes a routine to provide automatic frequency compensation according to well understood design principles to adjust for variations in temperature and supply voltage which are sensed from temperature sensor 56 and power supply 58. In addition processor 44 includes a routine for providing automatic reception gain adjustment for variations in signal propagation, variations in distance to and from an adjacent radio, and variations in adjacent radio transmitted signal level using conventional design considerations. Thus, the master and slave transceivers 14 and 12 have receivers sections which detect and track received signal strength.

The general programmability of processor 44 thus allows the master and slave transceivers 14 and 12 to transmit audible signals related to display, announcement, control, status, or configuration functions through a headset or handset speaker or other audio transducer 60 such as a separate speaker, buzzer, or piezoelectric device, or through interphone system 42.

In addition to audio signals, processor 44 can enable the master and slave transceivers 14 and 12 to receive or transmit digital signals through receiver 50 and transmitter 48 respectively related to display, announcement, control, status, or configuration functions. The coupling of headset 26 through codec 46 to processor 44, such as would be included in a headset or handset, allows processor 44 to also send and receive audible signals related to communications, display, announcement, control, status, or configuration functions. The earphone and microphone 62 of headset 26 is coupled to codec 46 to allow for communication to digital processor 44.

The master transceiver 14 comprises means for receiving signals to and from the slave transceiver 12 and can transmit the signals through the aircraft interphone system 42, such as when the communication link with the slave transceiver 12 is lost, broken or established or announce this status through audio transducer 60 and/or display this status through display 66. Conversely, the slave transceiver 12 comprises identical means to the master transceiver 14 to announce this status through transducer 60, display 66, as well as through the earphone of headset 26.

Because processor 44 of the master and slave transceivers 14 and 12 have resident memory, they can each be used to store and recall from nonvolatile memory 69 information such as, but not limited to, operational parameters, constants, or messages.

The master transceiver 14 of the wireless radio system 10 may be connected to the aircraft interphone system at any communication point in the system within or outside of the aircraft. Hence, in the preferred embodiment master transceiver 14 and slave transceiver 12 comply with RTCA DO-170 and DO-214 requirements which specify conventional aircraft interphone systems. In particular, the master transceiver 14 and slave transceiver 12 comply with RTCA DO-170 and DO-214 mechanical and electrical requirements. The mechanical requirement which is being referenced is that the aircraft jack 22 is a three-circuit, 0.25 inch circular connector. The electrical requirement which is being referenced is that the interphone system supplies a microphone bias current for all microphone connections. In other words, the master transceiver 14 fully replaces headsets, handsets, microphones, or earphones, (not shown) which comply with RTCA DO-170 and DO-214 electrical and mechanical requirements that connect to aircraft 24, and slave transceiver 12 accepts headsets, handsets, microphones or earphones which comply with RTCA DO-170 and DO-214 electrical and mechanical requirements. In such cases the headsets, handsets, microphones, or earphones associated with both master transceiver 14 and slave transceiver 12 can be provided with conventional active noise reduction means to eliminate unwanted noise such as disclosed in U.S. Pat. No. 6,278,786, incorporated herein by reference. Master transceiver 14 and slave transceiver 12 may be activated in a number of ways such as by a push-to-talk (PTT) switch 40, by a conventional voice activated transmission (VOX) means or by "switched on" transmission (SOX) means for "hands-free" operation included as part of processor 44 or a separate control circuit (not shown) whether or not master transceiver 14 and slave transceiver 12 are integrally provided with headsets or handsets or not. Still further master transceiver 14 and slave transceiver 12 can include a conventional means to adjust amplified audio in the earphones, such as low, medium and high volume levels.

In one embodiment, master transceiver 14 is even integrated into the aircraft interphone system 42. The master transceiver 14 comprises means for receiving signals from the slave transceiver 12 and broadcasts these signals through the aircraft interphone system 42 under the control of processor 44.

Where the master transceiver has an internal power source 58, it transmits its internal power source status to the slave transceiver 12 and also displays it on its corresponding indication display means 66. When the internal power source 58 is low, it is externally replenished by exchange or recharging. The low-power signal is preferably sent or signaled through the aircraft interphone system 42 whenever its internal power source 58 is low, or when replenishment is necessary. In addition the master transceiver 14 transmits its connection or coupling status with the aircraft interphone system 42 to the slave transceiver 12 and into interphone system 42. Thus, the master transceiver 14 generates audio or other cognizable signals communicated to the aircraft interphone system 42 when the master transceiver 14 is connected or coupled to the aircraft interphone system 42.

Master transceiver 14 and slave transceiver 12 further comprises means for initiating a paging signal to a slave transceiver 12 by use of subaudible or digital signals, and further comprise means for displaying information relating to an origin of a calling party such as "unit #1" or "tractor". When combined with a passenger address (PA) system 32, master transceiver 14 may include means to initiate a passenger address (PA) key (not shown) to signal the interphone system 42 to direct audio signals using output means 67 transmitted by the slave transceiver 12 and received by the master transceiver 14 to the passenger address (PA) system 32. The slave transceiver 12 further comprises means for initiating a control signal to the master transceiver 14 to designate routing of an audio signal to the passenger address (PA) system 32, using input means 64.

In a similar manner the slave transceiver 12 comprises means to transmit signals from headsets, handsets, and microphones which are connected to slave transceiver 12 to the aircraft interphone system 42. Once again the slave transceiver 12 accepts headsets, handsets, microphones, or earphones (not shown), which comply to RTCA DO-170 and DO-214 electrical and mechanical requirements described above. However, the invention also contemplates that slave transceiver 12 could also accept headsets, handsets, microphones, or earphones, which are not compliant with RTCA DO-170 and DO-214 requirements.

Like the master transceiver 14 the slave transceiver 12 further comprises an energy source 58 it includes, through processor 44 and display indicator 66 or audio transducer 60, a means for signaling a user when its energy source is low, or insufficient to maintain communications.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A wireless communications system for an aircraft interphone system compromising:

a master radio frequency (RF) transceiver having an internal power source;

coupling means to connect to an interphone system, the coupling means further detects electrical current from the interphone system; and at least one portable slave radio frequency (RF) transceiver having an internal power source and disposed away from a master unit, for use in communications with the interphone system.

2. The wireless communications system of claim 1 where the master and slave RF transceivers further comprise means to support either half or full duplex operation.

3. The wireless communications system of claim 1 where the master and slave RF transceivers further comprise means to provide either analog or digital data communications.

4. The wireless communications system of claim 1 in further combination with a uniquely associated network, and where the master and slave RF transceivers further comprise means to automatically acquire and track each other in the network.

5. The wireless communications system of claim 1 where the master and slave RF transceivers further comprise means to automatically hop to a different channel when interference is detected.

6. The wireless communications system of claim 1 where the master and slave RF transceivers further comprise means to support multiple networks of transceivers sharing the same radio frequency spectrum.

7. The wireless communications system of claim 1 where the master and slave RF transceivers further comprise means to employ a unique, reconfigurable "N-Bit" identification code for control channel and signal scrambling.

8. The wireless communications system of claim 1 where the master and slave RF transceivers further comprise audible announcement means including at least a speaker, buzzer, or piezoelectric device associated with an operation of display, announcement, control, status, or configuration.

9. The wireless communications system of claim 1 where the master and slave RF transceivers further comprise means to externally configure, signal, or operate the baseband processor by use of switches, buttons, keypad, or transmissions from another transceiver.

10. The wireless communications system of claim 1 where the master and slave RF transceivers further comprise display indication means including at least an incandescent, light emitting diode (LED), and liquid crystal display (LCD) to display status conditions associated with an operation of display, announcement, control, status, or configuration.

11. The wireless communications system of claim 1 where the master and slave RF transceivers further comprise means for connection to each other through wired means or wirelessly to verify performance capability before or after placing the master and slave RF transceivers into service.

12. The wireless communications system of claim 1 where the master and slave RF transceivers further comprise means to detect acquisition or loss of a communication link between each other as distinguished over interference.

13. The wireless communications system of claim 1 where the master and slave RF transceivers further comprise means to track calendar or chronological time.

14. The wireless communications system of claim 1 where the master and slave RF transceivers further comprise means to track of elapse time.

15. The wireless communications system of claim 1 where the master and slave RF transceivers further comprise means to store and recall in nonvolatile memory information including at least operational parameters, constants, or messages.

16. The wireless communications system of claim 1 where the master RF transceiver is connected to the aircraft interphone system.

17. The wireless communications system of claim 16 where the master RF transceiver has an internal power source and transmits its internal power source status to the slave RF transceiver.

18. The wireless communications system of claim 17 where the master RF transceiver generates a signal through the aircraft interphone system when the internal power source is low, or when replenishment is necessary.

19. The wireless communication system of claim 16 where the master RF transceiver further comprises means to transmit its connection or coupling status with the aircraft interphone system to the slave RF transceiver.

20. The wireless communications system of claim 16 where the master RF transceiver generates audio or other signals communicated to the aircraft interphone system when the master RF transceiver is connected to the aircraft interphone system.

21. The wireless communications system of claim 16 where the master RF transceiver further comprises an illumination beacon so it can be easily spotted.

22. The wireless communications system of claim 1 where the master RF transceiver is integrated into the aircraft interphone system.

23. The wireless communications system of claim 22 where the master RF transceiver mechanically accepts headsets, handsets, microphones, or earphones that require a 3-circuit, quarter-inch audio jack for connection.

24. The wireless communications system of claim 1 where the master RF transceiver further comprises means for receiving digital or audio signals from the slave RF transceiver and propagating slave RF transceiver transmission signals through the aircraft interphone system.

25. The wireless communications system of claim 1 where the master RF transceiver communicates audio or other signals through the aircraft interphone system when the communication link with the slave RF transceiver is lost or established.

26. The wireless communications system of claim 1 in further combination with a passenger address system and where the master RF transceiver further comprises means for initiating a passenger address (PA) key to direct audio transmitted by the slave RF transceiver and as received by the master RF transceiver to the passenger address (PA) system.

27. The wireless communications system of claim 1 in combination with a call station selection system and where the master RF transceiver further comprises means for receiving a control signal from the slave RF transceiver to designate routing of a call chime signal to the called station such as cockpit, forward cabin, mid cabin or aft cabin, and where the slave RF transceiver further comprises means for initiating a control signal to the master RF transceiver to designate routing of a call chime signal to the called station such as cockpit, forward cabin, mid cabin or aft cabin.

28. The wireless communications system of claim 1 in combination with a headset, handset, or microphone and where the slave RF transceiver further comprises means to transmit signals from the headset, handset, or microphone to the master RF transceiver that is connected to or integrated with an aircraft interphone system.

29. The wireless communications system of claim 1 in combination with a headset or handset having a microphone that requires a 3-circuit, quarter inch jack and where the slave RF transceiver further comprises means to provide an electrical bias for the microphone circuit in the headset or handset which is connected with the slave RF transceiver.

30. The wireless communications system of claim 1 in further combination with a handset or headset having earphones and where the slave RF transceiver is packaged integrally with or is packaged separately from the handset or headset.

31. The wireless communications system of claim 1 in further combination with a handset or headset having earphones and where the slave RF transceiver is packaged integrally with or is packaged separately from the handset or headset which includes a push-to-talk (PTT) switch.

32. The wireless communications system of claim 1 in further combination with a handset or headset having earphones and where the slave RF transceiver is packaged integrally with or is packaged separately from the handset or headset which includes "switched on" transmission (SOX) capability for "hands-free" operation.

33. The wireless communications system of claim 12 in further combination with an earphone and internal power in the slave RF transceiver, and where the slave RF transceiver generates a tone in the earphone when the communication between the master RF transceiver and slave RF transceiver is lost, interfered with, or broken, or when the internal power source is low, or requires replenishment.

34. The wireless communications system of claim 26 where the slave RF transceiver further comprises means for initiating a control signal to the master RF transceiver to designate routing of an audio signal to the passenger address (PA) system.

35. A wireless communications system for an aircraft interphone system comprising:

a master radio frequency (RF) transceiver for interfacing with the aircraft interphone system and for communicating with crew members, either within or outside of the aircraft, wherein the master RF transceiver is connected with the aircraft interphone system; and at least one slave radio frequency (RF) transceiver used by a crew person for wireless communications to the master RF transceiver and thence to the aircraft interphone system;

wherein the aircraft interphone system is characterized by having an electrical bias current and where the master RF transceiver uses an input the electrical bias current originating from the aircraft interphone system, and where the master RF transceiver mechanically connects to the aircraft interphone system by means of a 3-circuit, quarter-inch audio plug.

* * * * *